United States Patent
Hashimoto (10) Patent No.: US 7,501,162 B2
(45) Date of Patent: Mar. 10, 2009

(54) LIQUID CRYSTAL DISPLAY DEVICE AND LIQUID CRYSTAL DISPLAY

(75) Inventor: Shunichi Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 343 days.

(21) Appl. No.: 11/427,529

(22) Filed: Jun. 29, 2006

(65) Prior Publication Data

US 2007/0008474 A1    Jan. 11, 2007

(30) Foreign Application Priority Data

Jul. 5, 2005    (JP) .......................... P2005-195994

(51) Int. Cl.
*C09K 19/00*    (2006.01)
*C09K 19/52*    (2006.01)

(52) U.S. Cl. ..................... 428/1.1; 252/299.01; 430/20; 430/270.1; 349/176

(58) Field of Classification Search ................... 430/20, 430/220.1; 428/1.1; 252/299.01; 349/176
See application file for complete search history.

(56) References Cited

U.S. PATENT DOCUMENTS 5,764,324 A    6/1998    Lu et al.
2005/0057715 A1    3/2005    Hashimoto

FOREIGN PATENT DOCUMENTS

JP    10-206845    8/1998
JP    2005-084586    3/2005

*Primary Examiner*—Geraldina Visconti
(74) *Attorney, Agent, or Firm*—Sonnenschein Nath & Rosenthal LLP (57) ABSTRACT

A liquid crystal display which can secure long-time reliability of the display performance by stabilizing alignment characteristics of vertically aligned liquid crystal for a long time provided. The liquid crystal display device includes a semiconductor driver substrate and a transparent electrode substrate which are arranged appositely to each other; alignment films covering surfaces of the semiconductor driver substrate and the transparent electrode substrate, the surfaces facing each other, the alignment films containing silicon oxide and one or more moisture trap elements for trapping moisture; and vertically aligned liquid crystal enclosed between the semiconductor driver substrate and the transparent electrode substrate with the alignment film in between.

11 Claims, 4 Drawing Sheets

LIQUID CRYSTAL DISPLAY DEVICE AND LIQUID CRYSTAL DISPLAY

CROSS REFERENCES TO RELATED APPLICATIONS

The present invention contains subject matter related to Japanese Patent Application JP 2005-195994 filed in the Japanese Patent Office on Jul. 5, 2005, the entire contents of which being incorporated herein by reference.

BACKGROUND OF THE INVENTION

1. Field of the Invention

The present invention relates to a liquid crystal display device used for displaying images by using alignment characteristics of liquid crystal and a liquid crystal display for displaying images by utilizing the liquid crystal display device, particularly to a liquid crystal display device and a liquid crystal display which utilize vertically aligned liquid crystal.

2. Description of the Related Art

In recent years, small projection displays with high definition and high luminance have been increasingly demanded. Accordingly, as a display device for the projection display, a reflective device has been in practical use. By using the reflective device, a small projection display with high definition and high light use efficiency can be realized.

As the reflective device, an active reflective liquid crystal display device having a structure in which liquid crystal sandwiched by alignment films is enclosed between a semiconductor driver substrate and a transparent electrode substrate is known. The semiconductor driver substrate is structured in such a manner that a drive device for driving a circuit, a reflective electrode for reflecting light (so-called pixel electrode) and the like are provided on a semiconductor substrate. The transparent electrode substrate is structured in such a manner that a transparent electrode and the like are provided on a transparent substrate. The alignment film is intended to align liquid crystal molecules to a given alignment state.

In the reflective liquid crystal display device, when a voltage is applied between the pixel electrode and the transparent electrode, the alignment state of liquid crystal molecules is changed according to an electric potential difference between the electrodes, that is, the optical properties of the liquid crystal are changed. Therefore, light is modulated by utilizing such change in the optical properties of the liquid crystal. Thereby, gradation is performed based on the modulated light to display images.

Of the reflective liquid crystal display devices, in particular, a reflective liquid crystal display device utilizing liquid crystal having vertical alignment (so-called vertically aligned liquid crystal) has high contrast and high response speed. Therefore, such a device has attracted attentions as a device capable of improving display performance. The "vertically aligned liquid crystal" is a liquid crystal having negative dielectric anisotropy, that is, having characteristics that a difference $\delta\in$ ($=\in(\|)-\in(\bot)$) between a dielectric constant $\in(\|)$ in a direction parallel to a long axis of liquid crystal molecules and a dielectric constant $\in(\bot)$ in a direction perpendicular to the long axis of liquid crystal molecules is negative.

In the case that such vertically aligned liquid crystal is utilized, liquid crystal molecules are vertically aligned with respect to the substrate surface of the semiconductor driver substrate when an applied voltage is zero, and therefore a display state called normally black mode is obtained. Meanwhile, when a voltage is applied, liquid crystal molecules are tilted to the substrate surface, and therefore light transmittance is changed. In this case, in particular, when the tilt directions of the liquid crystal molecules are not in the same direction, the contrast becomes unevenness. To prevent such unevenness, it is necessary to align the liquid crystal molecules at a slight angle (pre-tilt angle) in advance in a certain direction.

As a method of aligning the vertically aligned liquid crystal so that a desired alignment state is obtained, there are two methods as follows. First, there is a method in which an organic alignment film typified by polyimide is used, more specifically the organic alignment film is rubbed and the alignment state is thereby controlled. Secondary, there is a method in which an inorganic alignment film typified by silicon oxide is used, more specifically the inorganic alignment film is obliquely evaporated and the alignment state is thereby controlled. Of the foregoing methods, the inorganic alignment film has attracted attentions as an alignment film capable of realizing high luminance of the foregoing projection display. In these days, there is a tendency that light source power is increased to realize high luminance of the projection display, that is, there is a tendency that alignment films are exposed to high power light. Considering such a tendency, to secure a display performance of the projection display for a long time, the inorganic alignment film with high light resistance is more preferably used than the organic alignment film with low light resistance. In the case of using the inorganic alignment film, when silicon oxide is obliquely evaporated, the pre-tilt angle can be controlled by changing the incident angle of the evaporation particles.

For a structure of the alignment film mounted in the reflective liquid crystal display device and a method of forming it, a plurality of techniques have been already known. Specifically, a technique in which a first obliquely evaporated alignment film is formed by obliquely evaporating silicon oxide from a first oblique evaporation direction so that a side surface of one of two pixel electrodes adjacent to each other is covered, and then a second obliquely evaporated alignment film is formed by obliquely evaporating silicon oxide from a second oblique evaporation direction so that a side surface of the other pixel electrode which is opposed to the side surface of the former pixel electrode is covered has been proposed (for example, refer to Japanese Unexamined Patent Application Publication No. 2005-084586). According to the technique, the peripheral structures of the side faces of the two pixel electrodes become symmetric to each other. Therefore, when the reflective liquid crystal display device is operated for a long time, it becomes difficult to generate a burn-in phenomenon resulting from asymmetry of the peripheral structures.

SUMMARY OF THE INVENTION

To promote widespread of the projection display utilizing the reflective liquid crystal display device, it is necessary to stabilize the long-time alignment characteristics of the vertically aligned liquid crystal in the reflective liquid crystal display device for securing long-time reliability of the display performance. However, in the existing projection displays, the alignment characteristics of the vertically aligned liquid crystal are easily changed due to influence of water in the process of long-time operation of the reflective liquid crystal display device. Therefore, in the existing projection displays, there has been a disadvantage that lowering of the contrast or display unevenness is easily generated. Such a disadvantage is not limited to the projection displays utilizing the reflective liquid crystal display device, but may similarly occur in projection displays utilizing a transmissive liquid crystal display device.

In view of the foregoing, in the invention, it is desirable to provide a liquid crystal display device or a liquid crystal display capable of securing long-time reliability of the display performance by stabilizing alignment characteristics of vertically aligned liquid crystal for a long time.

According to an embodiment of the invention, there is provided a liquid crystal display device including a semiconductor driver substrate and a transparent electrode substrate which are arranged oppositely to each other; alignment films covering surfaces of the semiconductor driver substrate and the transparent electrode substrate, the surfaces facing each other, the alignment films containing silicon oxide and one or more moisture trap elements for trapping moisture; and vertically aligned liquid crystal enclosed between the semiconductor driver substrate and the transparent electrode substrate with the alignment film in between.

According to an embodiment of the invention, there is provided a liquid crystal display including a liquid crystal display device and displaying an image by utilizing light modulated by the liquid crystal display device. The liquid crystal display device includes a semiconductor driver substrate and a transparent electrode substrate which are arranged oppositely to each other;, alignment films covering surfaces of the semiconductor driver substrate and the transparent electrode substrate, the surfaces facing each other, the alignment films containing silicon oxide and one or more moisture trap elements for trapping moisture; and vertically aligned liquid crystal enclosed between the semiconductor driver substrate and the transparent electrode substrate with the alignment film in between.

In the liquid crystal display device or the liquid crystal display according to the embodiment of the invention, the alignment film contains the moisture trap element together with silicon oxide. Therefore, when water enters inside the liquid crystal display device through the alignment film, the water trapping element contained in the alignment film traps water. More specifically, for example, when the water trapping element is a passivity forming element which is passivated by being reacted with water, such a passivity forming element is reacted with water and thereby passivated. In the result, the water is consumed for chemical reaction (passivation phenomenon) in the alignment film. Thereby, compared to the case that the alignment film does not contain the water trapping element, it becomes difficult for water to reach the vertically aligned liquid crystal in the process of long-time operation of the liquid crystal display device. Consequently, the alignment characteristics of the vertically aligned liquid crystal are not easily changed due to influence of water.

For the structure of the alignment film, the foregoing description, "the alignment film contains the moisture trap element together with silicon oxide" means an aspect that the moisture trap element as a sub component is added to silicon oxide as a main component, that is, means an aspect that the moisture trap element in a state of element exists in silicon oxide. This does not mean an aspect that a moisture trap element film is separately provided on a silicon oxide film (the moisture trap element in a state of a film independently exists).

According to the liquid crystal display device or the liquid crystal display of the embodiment of the invention, the alignment film contains the moisture trap element together with silicon oxide. Therefore, the alignment characteristics of the vertically aligned liquid crystal are not easily changed due to influence of water in the process of long-time operation.

Consequently, by stabilizing the alignment characteristics of the vertically aligned liquid crystal for a long time, long-time reliability of the display performance can be secured.

Other and further objects, features and advantages of the invention will appear more fully from the following description.

DETAILED DESCRIPTION OF THE PREFERRED EMBODIMENT

An embodiment of the invention will be hereinafter described in detail with reference to the drawings.

Figure 1:
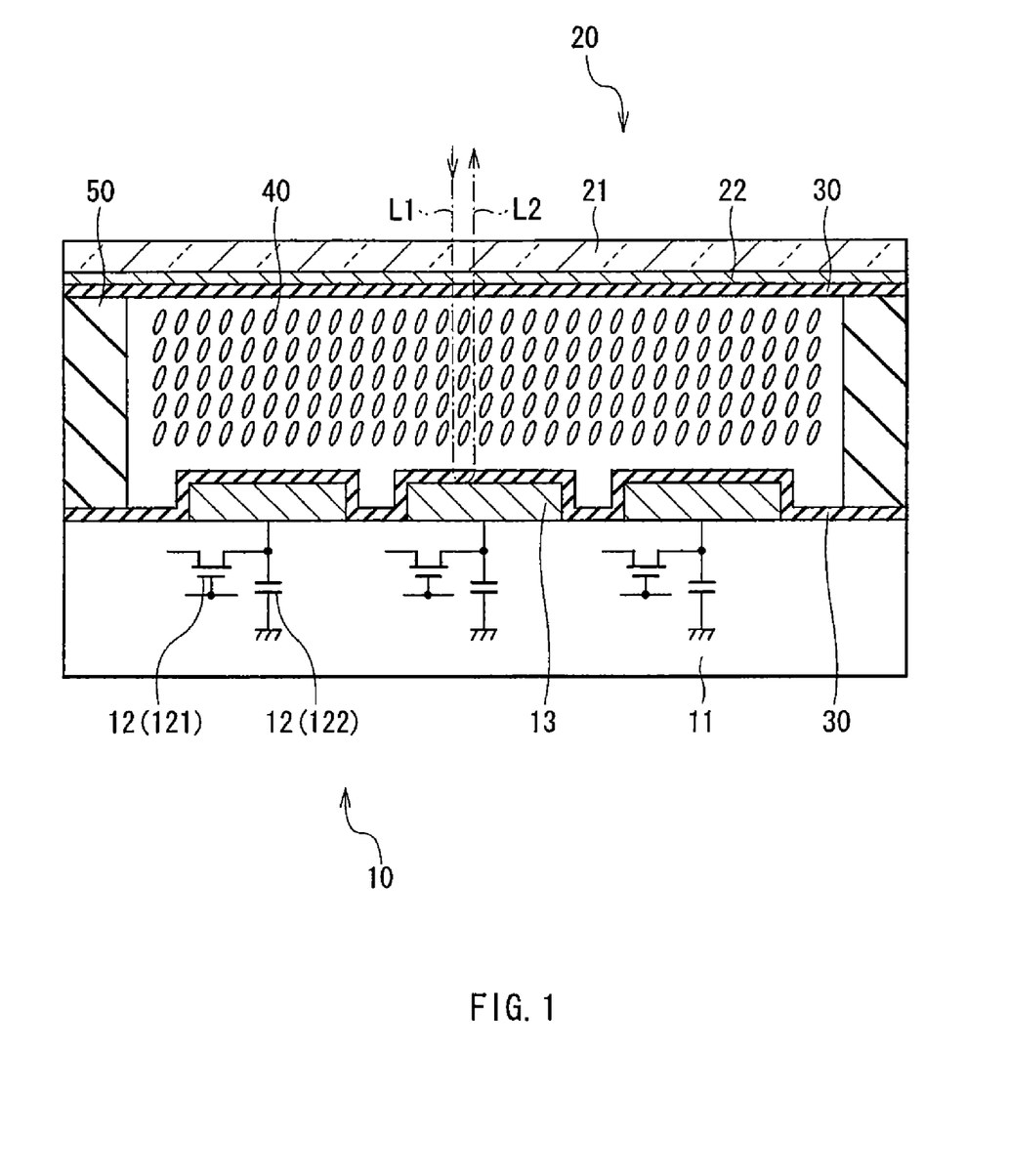
FIG. 1 is a cross section showing a cross sectional structure of a whole structure of a liquid crystal display device mounted in a liquid crystal display according to an embodiment of the invention

First, with reference to FIG. 1, descriptions will be given of a structure of a liquid crystal display device mounted on a liquid crystal display according to an embodiment of the invention. FIG. 1 shows a cross sectional structure of a whole structure of the liquid crystal display device.

The liquid crystal display device includes, for example, as shown in FIG. 1, a semiconductor driver substrate 10 and a transparent electrode substrate 20 which are arranged oppositely to each other, an alignment film 30 provided to coat opposite faces of the semiconductor driver substrate 10 and the transparent electrode substrate 20, and a vertically aligned liquid crystal 40 sandwiched by the alignment films 30, which is enclosed (arranged) between the semiconductor driver substrate 10 and the transparent electrode substrate 20. That is, the liquid crystal display device has a structure that the vertically aligned liquid crystal 40 is provided between the semiconductor driver substrate 10 and the transparent electrode substrate 20 in such a manner that the vertically aligned liquid crystal 40 is sandwiched between the alignment films 30. There is a space for accommodating the vertically aligned liquid crystal 40 between the semiconductor driver substrate 10 and the transparent electrode substrate 20. That is, a seal material 50 is provided so that the vertically aligned liquid crystal 40 is separated from the surroundings.

The semiconductor driver substrate 10 mainly controls the alignment state of the vertically aligned liquid crystal 40 by driving the vertically aligned liquid crystal 40. The semiconductor driver substrate 10 has a structure that a pixel electrode 13 is provided over a semiconductor substrate 11 in which a drive circuit including a drive device 12 is formed.

The semiconductor substrate 11 is made of, for example, single crystal silicon (Si). That is, the semiconductor driver substrate 10 is a so-called silicon drive device substrate.

The drive device 12 configures a drive circuit for driving the vertically aligned liquid crystal 40. The drive device 12 includes, for example, a CMOS (Complementary Metal Oxide Semiconductor) type/NMOS (Negative polarity Metal Oxide Semiconductor) type transistor 121, a capacitor (auxiliary capacity) 122 and the like. That is, the drive device 12 configures a so-called active drive circuit.

The pixel electrode 13 is one electrode for applying a voltage to the vertically aligned liquid crystal 40. The plurality of pixel electrodes 13 are segmentally arranged so that a matrix arrangement pattern can be thereby obtained. That is, each pixel electrode 13 is independently supplied with an electric potential. Here, the pixel electrode 13 is, for example, a reflective electrode having light reflectivity. That is, the liquid crystal display device according to this embodiment is a so-called reflective liquid crystal display device. The pixel electrode 13 is made of, for example, a metal having high light reflectivity such as aluminum (Al) and silver (Ag). For example, the pixel electrode 13 may be coated with a reflective layer having a multilayer film structure such as a dielectric mirror so that the reflectance is increased. Otherwise, the pixel electrode 13 may be coated with a protective film such as an oxide and a nitride so that the pixel electrode 13 is protected from outside.

The transparent electrode substrate 20 mainly transmits light entering from outside to inside of the liquid crystal display device (incident light L1) and light exits outside by being modulated in the liquid crystal display device (exiting light L2). The transparent electrode substrate 20 has a structure in which a transparent electrode 22 is provided over a transparent substrate 21.

The transparent substrate 21 is made of, for example, a transparent (light transmissive) material such as glass.

The transparent electrode 22 is the other electrode for applying a voltage to the vertically aligned liquid crystal 40. The transparent electrode 22 extends to continuously go through a region opposed to each pixel electrode 13. That is, the transparent electrode 22 is supplied with a common electric potential. The transparent electrode 22 is made of, for example, a transparent electrode material such as indium tin oxide (ITO).

The alignment film 30 orients the vertically aligned liquid crystal 40 so that a given alignment state can be obtained. As described above, the alignment film 30 coats respective internal faces of the semiconductor driver substrate 10 and the transparent electrode substrate 20, that is, coats faces on the side adjacent to the vertically aligned liquid crystal 40. More specifically, the alignment film 30 coats the pixel electrode 13 and the semiconductor substrate 11 on the periphery thereof in the semiconductor driver substrate 10, and coats the transparent electrode 22 in the transparent electrode substrate 20.

In particular, the alignment film 30 has a function to prevent water which enters inside the liquid crystal display device through the alignment film 30 from reaching the vertically aligned liquid crystal 40, in addition to a function to align the vertically aligned liquid crystal 40 as descried above. For the function to prevent water from entering, the alignment film 30 contains a moisture trap element together with silicon oxide. That is, in the alignment film 30, a moisture trap element as a sub component is added to silicon oxide as a main component. The moisture trap element traps water entering into the alignment film 30 by utilizing some chemical phenomenon. Here, the moisture trap element is an element for trapping water by utilizing passivation phenomenon (so-called passivity forming element), that is, by utilizing chemical phenomenon that the moisture trap element is reacted with water or oxygen and is thereby passivated (forms a hydrate or a hydroxide). The moisture trap element is titanium (Ti), aluminum (Al), chromium (Cr), or a mixture thereof. The foregoing passivity forming element is not limited to the foregoing three elements and the mixtures thereof, but may be one of the group consisting of molybdenum (Mo), vanadium (V), zirconium (Zr), tantalum (Ta), tungsten (W), cobalt (Co), iron (Fe), nickel (Ni), and niobium (Nb) together with the foregoing titanium, aluminum, and chromium, or a mixture thereof.

The content of the passivity forming element as a moisture trap element can be freely set as long as the passivity forming element can trap water. However, to sufficiently trap water, for example, the content of the passivity forming element is preferably about 0.1 wt % or more. When the content is smaller than about 0.1 wt %, it becomes difficult to sufficiently trap water by utilizing passivation phenomenon of the passivity forming element. Further, from the viewpoint other than sufficiently trapping water, for example, the content of the passivity forming element is preferably 20 wt % or less. When the content is larger than about 20 wt %, though water can be sufficiently trapped, transparency (light transmittance) of the alignment film 30 is lowered, or apparent reflectance of the pixel electrode 13 (light reflectance) is lowered. In the result, to sufficiently trap water and secure the transparency of the alignment film 30 and the apparent reflectance of the pixel electrode 13, the content of the passivity forming element is preferably from 0.1 wt % to 20 wt %. In this case, in particular, when the margins are set considering variation of the content, the content is preferably, for example, from about 1 wt % to 10 wt %.

The alignment film 30 can be formed by, for example, using evaporation or sputtering. When the alignment film 30 is formed, for example, it is possible that silicon oxide and a moisture trap element are previously mixed, and the alignment film 30 is formed by using a mixture thereof. Otherwise, it is possible that an evaporation source of silicon oxide and an evaporation source of the moisture trap element are separately prepared, and the alignment film 30 is formed by multiple evaporation with two evaporation sources.

In particular, the alignment film 30 is an obliquely evaporated film, for example. The "obliquely evaporated film" means a evaporated film which is formed by depositing evaporation particles supplied from an oblique direction with respect to a substance subject to evaporation. The obliquely evaporated film has film characteristics different from of a "vertically evaporated film," that is, a evaporated film formed by depositing evaporation particles supplied from a direction perpendicular to a substance subject to evaporation. When the alignment film 30 is formed by oblique evaporation, a pre-tilt angle of the vertically aligned liquid crystal 40 can be controlled by changing an incident angle of evaporation particles. The incident angle of the evaporation particles is, for example, about 45 deg to 65 deg with respect to a vertical line of the semiconductor substrate 11.

The vertically aligned liquid crystal 40 modulates the incident light L1 by changing the alignment state according to a voltage applied to the pixel electrode 13 and the transparent electrode 22. In the vertically aligned liquid crystal 40, when an applied voltage is zero, liquid crystal molecules are aligned perpendicular to the substrate surface of the semiconductor substrate 11 (so-called normally black mode), while when a voltage is applied, alignment of the liquid crystal molecules is tilted to the substrate surface. In particular, in the vertically aligned liquid crystal 40, when an applied voltage is zero, the liquid crystal molecules are tilted at a pre-tilt angle in a certain direction. The certain direction means, for example, an opposite angle direction in the top face of the pixel electrode 13 (about 45 deg direction). The pre-tilt angle is a slight angle such as about from 1 deg to 5 deg. The reason why the pre-tilt angle is slight is as follows. When the pre-tilt angle is excessively large, the vertical alignment of the liquid crystal molecules is deteriorated, that is, the contrast is lowered resulting from increase in the black level.

The seal material 50 seals the space between the semiconductor driver substrate 10 and the transparent electrode substrate 20 to enclose the vertically aligned liquid crystal 40 therebetween. The seal material 50 is, for example, from 1 mm to 2 mm wide.

Figure 2:
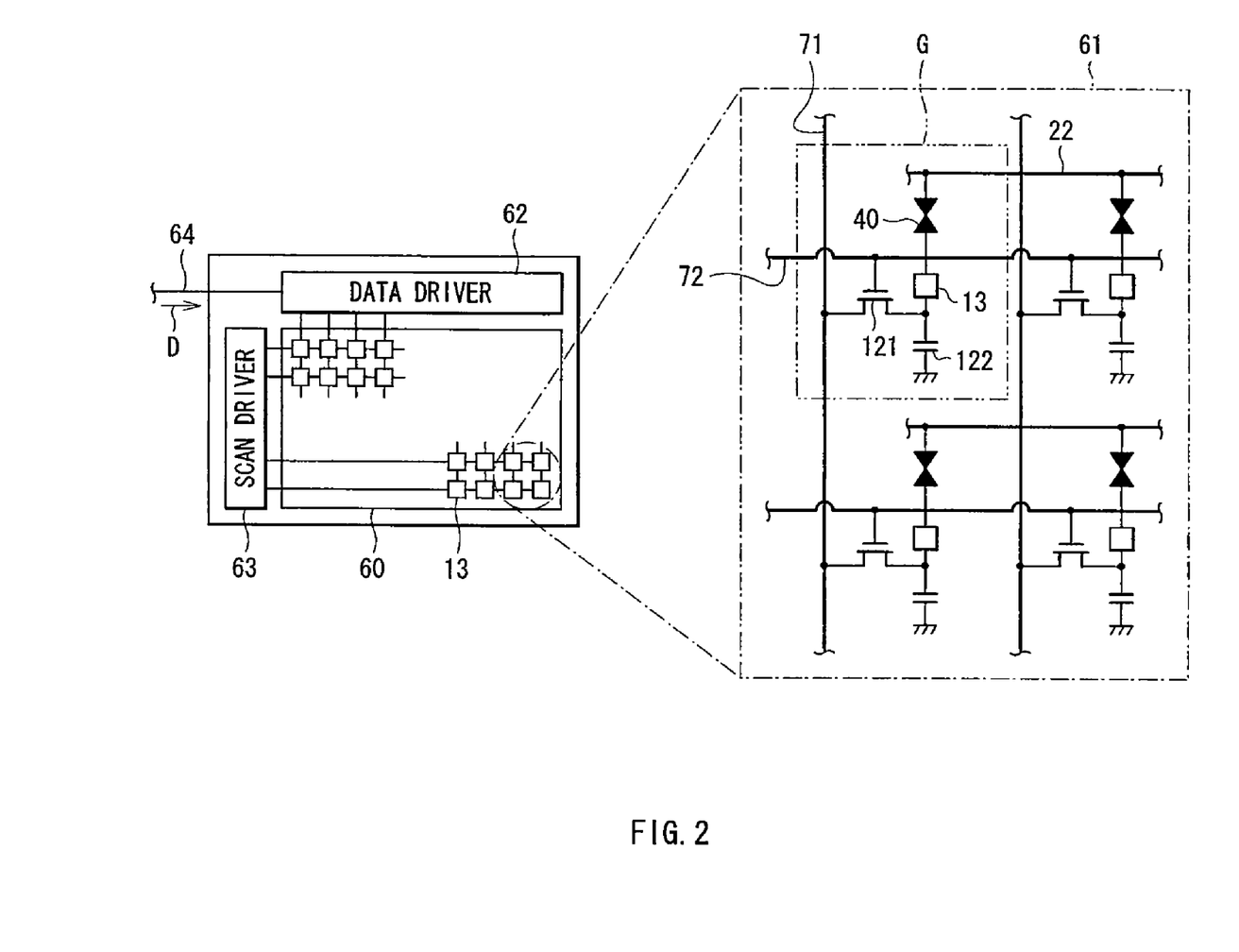
FIG. 2 is a diagram showing a circuit structure of the liquid crystal display device shown in FIG. 1.

Next, with reference to FIG. 1 and FIG. 2, descriptions will be given of the structure of the liquid crystal display device in detail. FIG. 2 shows a circuit structure of the liquid crystal display device shown in FIG. 1.

Of the liquid crystal display device shown in FIG. 1, a circuit section includes, for example, as shown in FIG. 2, a pixel drive circuit 61 forming a plurality of pixels G in a display region 60, and a data driver 62 and a scan driver 63 provided on the periphery of the display region 60.

The pixel drive circuit 61 is provided in a layer of the semiconductor substrate 11 lower than the pixel electrode 13. For example, the pixel drive circuit 61 includes the foregoing transistor 121 and the capacitor 122. In the pixel drive circuit 61, one pixel G is formed from the pixel electrode 13, the vertically aligned liquid crystal 40, together with the transistor 121 and the capacitor 122. The foregoing display region 60 is a region on which an image is displayed. That is, the display region 60 is a region which can display an image by arranging the plurality of pixels G in a matrix state. In FIG. 2, in addition to the view showing the display region 60 including the plurality of pixels G, a region corresponding to four pixels G of the pixel drive circuit 61 is separately shown as an enlarged view.

In the pixel drive circuit 61, a plurality of data lines 71 are arranged in the row direction, and a plurality of scanning lines 72 are arranged in the column direction. The pixel G is formed in an intersection of the data line 71 and the scanning line 72. In each transistor 121, a source electrode is connected to the data line 71, a gate electrode is connected to the scanning line 72, and a drain electrode is connected to the capacitor 122 and the pixel electrode 13. Each data line 71 is connected to the data driver 62 and is supplied with image signals from the data driver 62. Each scanning line 72 is connected to the scan driver 63, and is sequentially supplied with scanning signals from the scan driver 63.

The data driver 62 and the scan driver 63 select a certain pixel G from the plurality of pixels G. An image signal D is externally inputted to the data driver 62 from outside through a signal line 64.

Next, with reference to FIG. 1 and FIG. 2, descriptions will be given of operations of the liquid crystal display device.

In the liquid crystal display device, when the incident light L1 enters via the transparent electrode substrate 20, the incident light L1 passes through the vertically aligned liquid crystal 40, and then is reflected by the picture electrode 13, and thereby exits as the exiting light L2 via the transparent electrode substrate 20 again.

When a voltage is applied between the pixel electrode 13 and the transparent electrode 22, an alignment state of the vertically aligned liquid crystal 40 is changed according to an electric potential between the electrodes. Therefore, optical properties of the vertically aligned liquid crystal 40 are changed. Thereby, the incident light L1 is modulated, that is, gradation is performed based on the modulated exiting light L2. In the result, images are displayed.

When the alignment state of the vertically aligned liquid crystal 40 is changed, a voltage is applied by the pixel drive circuit 61. At this time, the data driver 62 supplies an image signal to the data line 71 based on the image signal D inputted through the signal line 64 and the scan driver 63 sequentially supplies a scanning signal to the scanning line 72 at a given timing. Thereby, in the pixel G which is scanned according to the scanning signal supplied to the scanning line 72 and selected according to the image signal supplied to the data line 71, the alignment state of the vertically aligned liquid crystal 40 is changed.

Figure 3:
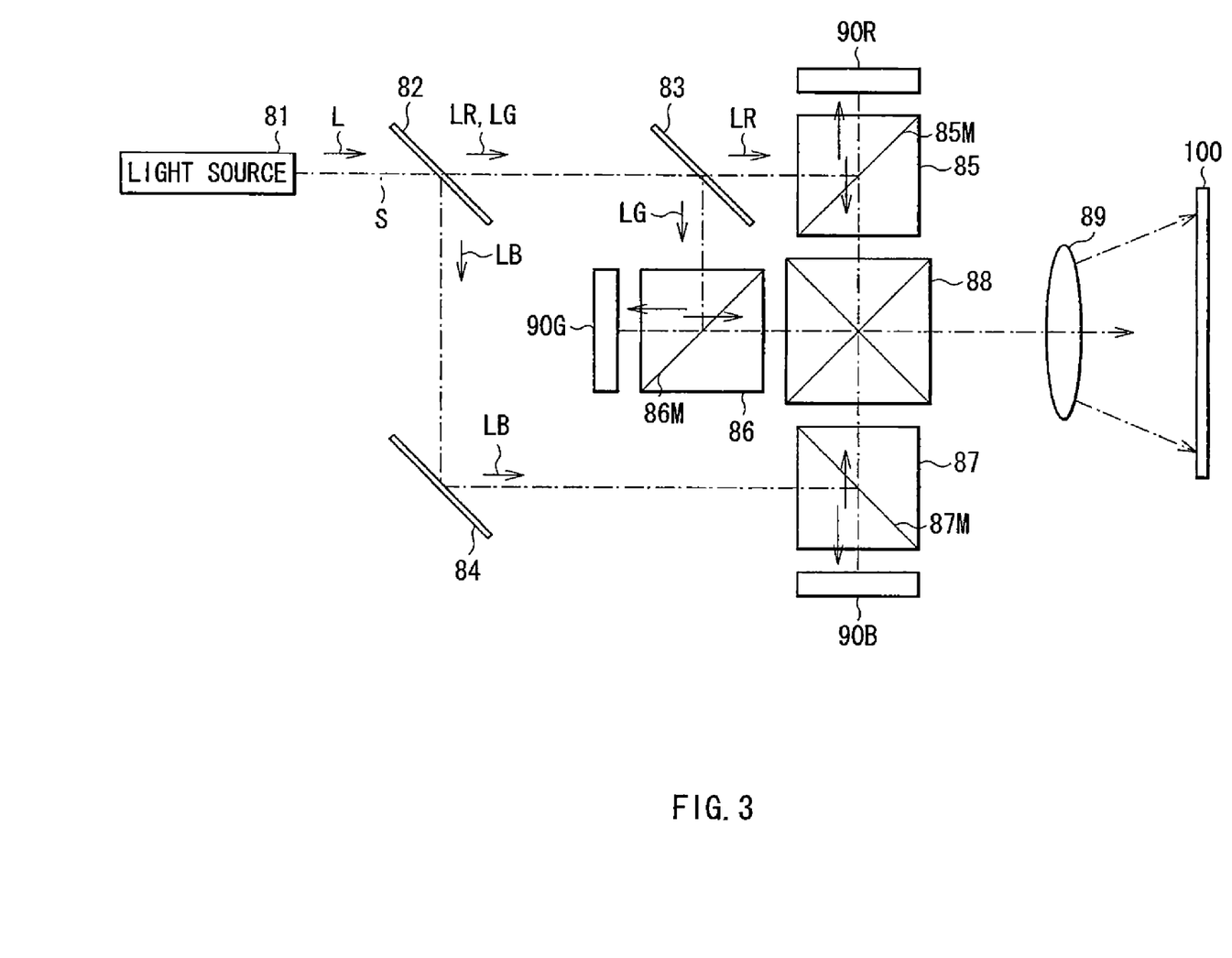
FIG. 3 is a view showing a model of a structure of the liquid crystal display according to the embodiment of the invention.

Next, with reference to FIG. 3, descriptions will be given of a configuration of the liquid crystal display according to this embodiment. FIG. 3 shows a model of the configuration of the liquid crystal display mounting the liquid crystal display device shown in FIG. 1 and FIG. 2.

The liquid crystal display according to this embodiment is, for example, a liquid crystal projector utilizing the liquid crystal display device shown in FIG. 1 and FIG. 2 as a light valve. More specifically, the liquid crystal display is a triple-light valve type reflective liquid crystal projector for displaying full color images on a screen 100 by utilizing three-color liquid crystal light valves, that is, a liquid crystal light valve for red 90R, a liquid crystal light valve for green 90G, and a liquid crystal light valve for blue 90B.

The liquid crystal display includes, for example, as shown in FIG. 3, a light source 81, dichroic mirrors 82, 83, a total reflection mirror 84, polarizing beam splitters 85, 86, 87, a color-mixture prism 88, and a projection lens 89. Such a series of components is arranged along a light axis S.

The light source 81 generates white light L including red light LR, green light LG, and blue light LB. The light source 81 is, for example, a halogen lamp, a metal halide lamp, a xenon lamp or the like.

The dichroic mirror 82 splits the white light L into the blue light LB and other mixed light (the red light LR and the green light LG). The dichroic mirror 82 is arranged between the light source 81 and the dichroic mirror 83 or the total reflection mirror 84. That is, the dichroic mirror 82 guides the blue light LB to the total reflection mirror 84 and guides other mixed light to the dichroic mirror 83.

The dichroic mirror 83 splits the mixed light guided via the dichroic mirror 82 into the red light LR and the green light LG. The dichroic mirror 83 is arranged between the dichroic mirror 82 and the polarizing beam splitters 85, 86. That is, the dichroic mirror 83 guides the red light LR to the polarizing beam splitter 85 and guides the green light LG to the polarizing beam splitter 86.

The total reflection mirror 84 reflects the blue light LB guided via the dichroic mirror 82. The total reflection mirror 84 is arranged between the dichroic mirror 82 and the polarizing beam splitter 87. That is, the total reflection mirror 84 guides the blue light LB to the polarizing beam splitter 87.

The polarizing beam splitter 85 is arranged between the liquid crystal light valve 90R and the color-mixture prism 88 on the light path of the red light LR. The polarizing beam splitter 85 has a polarization split face 85M. On the polarization split face 85M, the polarizing beam splitter 85 splits the red light LR into two polarization components perpendicular to each other. The polarization split face 85M reflects one polarization component (for example, S-polarized component) and guides the reflected polarization component to the liquid crystal light valve 90R. Meanwhile, the polarization split face 85M transmits the other polarization component (for example, P-polarized component). The polarizing beam splitters 86, 87 respectively have a function and a structure similar to that of the polarizing beam splitter 85, except that the polarizing beam splitter 86 splits the green light LG into two polarization components perpendicular to each other and the polarizing beam splitter 87 splits the blue light LB into two polarization components perpendicular to each other. That is, the polarizing beam splitter 86 is arranged between the liquid crystal light valve 90G and the color-mixture prism 88 on the light path of the green light LG, and has a polarization split face 86M. The polarizing beam splitter 87 is arranged between the liquid crystal light valve 90B and the color-mixture prism 88 on the light path of the blue light LB, and has a polarization split face 87M.

The liquid crystal light valve 90R performs driving according to a drive voltage supplied based on an image signal, and thereby modulates the red light LR guided via the polarizing beam splitter 85 (for example, S-polarized component). The liquid crystal light valve 90R is arranged oppositely to the polarizing beam splitter 85 and reflects light which is modulated (modulated light) toward the polarizing beam splitter 85. The liquid crystal light valves 90G, 90B have a function and a structure similar to that of the liquid crystal light valve 90R, except that the liquid crystal light valve 90G modulates the light guided via the polarizing beam splitter 86 and the liquid crystal light valve 90B modulates the light guided via the polarizing beam splitter 87. That is, the liquid crystal light valve 90G modulates the green light LG (for example, S-polarized component), and then reflects modulated light thereof toward the polarizing beam splitter 86. The liquid crystal light valve 90B modulates the blue light LB (for example, S-polarized component), and then reflects modulated light thereof toward the polarizing beam splitter 87.

The color-mixture prism 88 synthesizes the light which is modulated by the liquid crystal light valves 90R, 90G, 90B and guided via the polarizing beam splitters 85, 86, 87. The color-mixture prism 88 is arranged in such a manner that the three sides of the color-mixture prism 88 are surrounded by the polarizing beam splitters 85, 86, 87. The color-mixture prism 88 emits light which is synthesized (synthesized light) toward the projection lens 89.

The projection lens 89 projects the synthesized light exits from the color-mixture prism 88 on the screen 100 to display an image.

In the liquid crystal display, when the white light L is generated from the light source 81, the white light L is split into the red light LR, the green light LG, and the blue light LB at the dichroic mirrors 82, 83. The red light LR, the green light LG, and the blue light LB is respectively split into given polarization components (for example, S-polarized component) at the polarizing beam splitters 85, 86, 87, and then is modulated at the liquid crystal light valves 90R, 90G, 90B. Thereby, modulated light thereof is finally synthesized at the color-mixture prism 88. The synthesized light is projected by the projection lens 89 on the screen 100. Thereby, a full color image is displayed on the screen 100.

In the liquid crystal display or the liquid crystal display device according to this embodiment, the alignment film 30 contains the water trapping element together with silicon oxide. Therefore, long-time reliability of the display performance can be secured by stabilizing the alignment characteristics of the vertically aligned liquid crystal 40 for a long time from the following reason.

That is, as an alignment film mounted on the liquid crystal display device, as described in the foregoing "Description of the Related Art," the inorganic alignment film which is made of silicon oxide, that is, which does not contain a water trapping element has been known. When such an alignment film is used, the vertically aligned liquid crystal can be aligned so that a given alignment state is obtained. Therefore, it is needless to say that such an alignment film plays the primary role as an alignment film. However, in the existing liquid crystal display device mounting such an alignment film, with reference to the structure of the liquid crystal display device according to this embodiment shown in FIG. 1, the alignment film is provided to cover one surface of the semiconductor driver substrate (the pixel electrode and the semiconductor substrate on the periphery thereof) and cover one surface of the transparent electrode substrate (transparent electrode). That is, the existing liquid crystal display device has a structure that edges of the alignment film are exposed to the air. In the result, in the process of a long-time operation of the liquid crystal display device, water (for example, moisture in the air) easily entered inside the liquid crystal display device through the alignment film at such exposed portions. In particular, silicon oxide which is a material of the alignment film has high water absorbing characteristics as known as silica gel. Therefore, in the view from the water absorbing characteristics inherent in the material, water tends to enter inside the liquid crystal display device through the alignment film. In the case that water enters inside the liquid crystal display device, when water reaches the vertically aligned liquid crystal, the alignment characteristics of the vertically aligned liquid crystal are influenced by water and become subject to change. Therefore, lowering of the image contrast or display unevenness in images becomes easily generated. It is needless to say that such a tendency becomes more notable as the humidity in the environment where the liquid crystal display device is exposed becomes higher, or as duration for which the liquid crystal display device is kept in the humid environment becomes longer. Consequently, in the existing liquid crystal display device, it is difficult to stabilize the alignment characteristics of the vertically aligned liquid crystal for a long time, and therefore it is difficult to secure long-time reliability of the display performance as well.

Meanwhile, in the liquid crystal display device according to this embodiment, as shown in FIG. 1, the alignment film 30 contains a moisture trap element (for example, a passivity forming element) together with silicon oxide. Therefore, even if water enters inside the liquid crystal display device from the exposed portions of the alignment film 30, it becomes difficult for such water to reach the vertically aligned liquid crystal 40. More specifically, when water enters through the alignment film 30, the moisture trap element contained in the alignment film 30 traps the water, that is, the passivity forming element reacts with the water and thereby becomes passivated. Therefore, the water is consumed for chemical reaction (passivation phenomenon) in the alignment film 30. In this case, compared to the existing liquid crystal display device in which the alignment film does not contain a moisture trap element, as water is consumed for chemical reaction in the alignment film 30, it becomes difficult for water to reach the vertically aligned liquid crystal 40 in the process of a long-time operation of the liquid crystal display device. Therefore, it becomes difficult for the alignment characteristics of the vertically aligned liquid crystal 40 are not easily changed by influence of water. Thereby, lowering of the image contrast or display unevenness in images is prevented. Therefore, in the liquid crystal display device according to this embodiment, long-time reliability of the display performance can be secured by stabilizing the alignment characteristics of the vertically aligned liquid crystal 40 for a long time.

In particular, in this embodiment, when the content of the moisture trap element is from 0.1 wt % to 20 wt %, as described above, water is sufficiently trapped in the alignment film 30, and transparency of the alignment film 30 and apparent reflectance of the pixel electrode 13 can be secured. Therefore, it becomes possible to prevent the image contrast from lowering.

Further, in this embodiment, the alignment film 30 is an obliquely evaporated film. Therefore, the alignment film 30 has a columnar alignment structure tilted in an oblique direction (the direction in which evaporation particles are supplied in oblique evaporation). In this case, the vertically aligned liquid crystal 40 is aligned along the alignment structure of the alignment film 30. Therefore, the alignment state of the vertically aligned liquid crystal 40 can be controlled so that a desired alignment state is obtained by utilizing the alignment film 30.

Further, in this embodiment, as described above, since the alignment film 30 contains the moisture trap element, it becomes difficult for water to pass through the alignment film 30. Therefore, the water can be effectively prevented from reaching the vertically aligned liquid crystal 40. That is, as a measure to prevent water from reaching the vertically aligned liquid crystal, instead of the measure that the moisture trap element is contained in the alignment film, a method that exposed portions of the alignment film are coated with some coating material (for example, water-proof material) seems to be expected. In this case, it becomes difficult for water to enter inside the liquid crystal display device through the exposed portions of the alignment film. However, once water enters inside the liquid crystal display device through the alignment film, the water easily reaches the vertically aligned liquid crystal. That is, in this case, as far as the material of the alignment film tends to easily absorb water, it is difficult to effectively prevent water from reaching the vertically aligned liquid crystal. Meanwhile, in this embodiment, it is difficult for water to pass through the alignment film 30, and therefore the water can be effectively prevented from reaching the vertically aligned liquid crystal 40.

Figure 4:
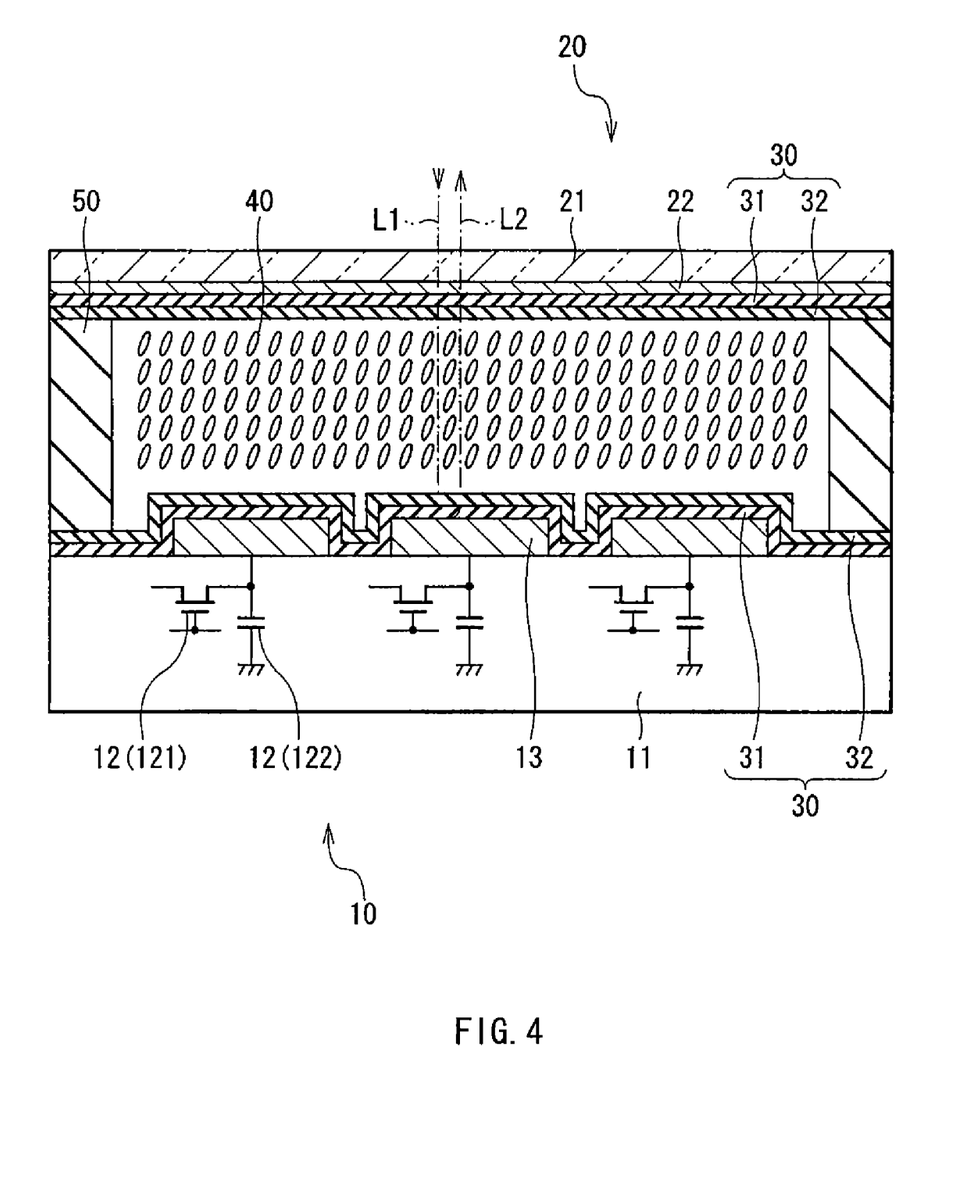
FIG. 4 is a cross section showing a modification of the structure of the liquid crystal display device mounted in the liquid crystal display according to the embodiment of the invention.

In this embodiment, as shown in FIG. 1, the alignment film 30 is structured to have a single layer structure composed of the obliquely evaporated film. However, the structure is not limited thereto, but the alignment film 30 may be structured to have a lamination structure including the obliquely evaporated film. Specifically, for example, as shown in FIG. 4 corresponding to FIG. 1, it is possible that the alignment film 30 is structured to have a two-layer structure in which an external alignment film 31 which is a vertically evaporated film and an internal alignment film 32 which is an obliquely evaporated film are layered in the order from the side close to the semiconductor driver substrate 10 or the transparent electrode substrate 20. Both the external alignment film 31 and the internal alignment film 32 have, for example, a structure similar to that of the alignment film 30 having the foregoing single layer structure, that is, contain the moisture trap element together with silicon oxide. In this case, effects similar to that of the foregoing embodiment can be obtained. The structure other than the foregoing of the liquid crystal display device shown in FIG. 4 is similar to of FIG. 1.

In the case shown in FIG. 4, in particular, as a foundation for the internal alignment film 32 which is an obliquely evaporated film, the external alignment film 31 which is a vertically evaporated film is provided. That is, in the process of forming the alignment film 30, the external alignment film 31 which is a vertically evaporated film is formed, and then the internal alignment film 32 which is an obliquely evaporated film is formed on the external alignment film 31. Therefore, the alignment structure of the external alignment film 31 which is a foundation (vertically evaporated film) reflects in determining the alignment structure of the internal alignment film 32 (obliquely evaporated film). Therefore, compared the case that the external alignment film 31 which is a foundation (vertically evaporated film) is not formed and the internal alignment film 32 (obliquely evaporated film) is formed singly (substantially, the case that the alignment film 30 is formed to have a single layer structure of the obliquely evaporated film as described in the foregoing embodiment), crystallinity of the internal alignment film 32 is improved. Therefore, the alignment structure of the internal alignment film 32 which is an obliquely evaporated film can be strictly controlled.

In the case shown in FIG. 4, the moisture trap element is contained in both the external alignment film 31 and the internal alignment film 32. However, the structure is not limited thereto, but, for example, it is possible that the moisture trap element is not contained in the external alignment film 31, and the moisture trap element is contained only in the internal alignment film 32. In general, when the density in the film is compared between the vertically evaporated film and the obliquely evaporated film, in other words, when the occupancy ratio of voids included in the film is compared between the vertically evaporated film and the obliquely evaporated film, the occupancy ratio of voids for the vertically evaporated film is smaller than for the obliquely evaporated film. Therefore, easiness of water impregnation in the vertically evaporated film is smaller than in the obliquely evaporated film as well. Therefore, when the external alignment film 31, which is a vertically evaporated film, has sufficient film characteristics to prevent water from reaching the vertically aligned liquid crystal 40, effects almost similar to that of the foregoing embodiment can be obtained even if the external alignment film 31 does not contain the moisture trap element.

The following descriptions will be given for confirmation. In the case shown in FIG. 4, the alignment film 30 is structured to have a two-layer structure in which the external alignment film 31 which is a vertically evaporated film and the internal alignment film 32 which is an obliquely evaporated film are layered. However, the structure of the alignment film 30 is not limited thereto, but the lamination structure and the number of layers of the alignment film 30 can be freely changed as long as the vertically aligned liquid crystal 40 can be aligned so that a desired alignment is obtained by utilizing the alignment film 30.

EXAMPLES

Next, descriptions will be given of examples according to the invention.

Example 1-1

The liquid crystal display device according to the invention was manufactured through the following procedure. That is, first, a semiconductor driver substrate in which a pixel electrode made of aluminum (Al) was provided on a semiconductor substrate made of silicon (Si) and a transparent electrode substrate in which a transparent electrode was provided on a transparent substrate made of glass were prepared. In this case, the electrode shape and the arrangement pattern of the pixel electrode were set so that the pixel pitch was 9 μm and the distance between pixels (groove width between pixels) was 0.35 μm. Further, to protect the pixel electrode, a silicon oxide passivation film was formed to coat the pixel electrode by using Chemical Vapor Deposition method, and thereby a protective film was formed to have a thickness of 45 nm.

Subsequently, the semiconductor driver substrate and the transparent electrode substrate were washed. After that, an alignment film was formed to have a thickness of 50 nm on the semiconductor driver substrate and the transparent electrode substrate by oblique evaporation utilizing a vapor deposition apparatus. In this case, the alignment film contained a moisture trap element which was a sub component together with silicon oxide which was a main component. As the moisture trap element, titanium (Ti) which was a passivity forming element was used. In particular, by setting the conditions that the content of the moisture trap element was 0.1 wt % and the incident angle of evaporation particles was from 50 deg to 55 deg, the pre-tilt angle was set to be 2.5 deg. Subsequently, the semiconductor driver substrate and the transparent electrode substrate were arranged oppositely to each other so that the alignment films faced to each other. A cell gap between the substrates was sealed by a sealing material so that the cell gap became 2 μm. Finally, vertically aligned liquid crystal having negative dielectric anisotropy was enclosed in the cell gap, and thereby a reflective liquid crystal display device was completed.

Example 1-2

A liquid crystal display device was manufactured through a procedure similar to of Example 1-1, except that the content of the moisture trap element was changed to 1 wt %.

Example 1-3

A liquid crystal display device was manufactured through a procedure similar to of Example 1-1, except that the content of the moisture trap element was changed to 10 wt %.

Example 1-4

A liquid crystal display device was manufactured through a procedure similar to of Example 1-1, except that the content of the moisture trap element was changed to 20 wt %.

Example 1-5

A liquid crystal display device was manufactured through a procedure similar to of Example 1-1, except that the content of the moisture trap element was changed to 25 wt %.

Example 2-1

A liquid crystal display device was manufactured through a procedure similar to of Example 1-1, except that aluminum (Al) was used as a moisture trap element instead of titanium, and the content of the moisture trap element was 1 wt %.

Example 2-2

A liquid crystal display device was manufactured through a procedure similar to of Example 2-1, except that the content of the moisture trap element was changed to 10 wt %.

Example 3-1

A liquid crystal display device was manufactured through a procedure similar to of Example 1-1, except that chromium (Cr) was used as a moisture trap element instead of titanium, and the content of the moisture trap element was 1 wt %.

Example 3-2

A liquid crystal display device was manufactured through a procedure similar to of Example 3-1, except that the content of the moisture trap element was changed to 10 wt %.

Example 4

A liquid crystal display device was manufactured through a procedure similar to of Example 1-1, except that a mixture of titanium and aluminum was used as a moisture trap element instead of titanium, and the content of each moisture trap element was 2.5 wt %.

Comparative Example

A liquid crystal display device was manufactured through a procedure similar to of Example 1-1, except that an alignment film containing no moisture trap element was formed.

When performances of the foregoing liquid crystal display devices of the invention, that is, the performances of the liquid crystal display devices of Examples 1-1 to 1-5 (moisture trap element was titanium), Examples 2-1 and 2-2 (moisture trap element was aluminum), Examples 3-1 and 3-2 (moisture trap element was chromium), and Example 4 (moisture trap element was mixture of titanium and aluminum) were examined, the results shown in Table 1 were obtained. Table 1 shows performances of the liquid crystal display devices. When the performances of the liquid crystal display devices were examined, the liquid crystal display devices were left for 1000 hours in the high temperature and high humidity environment that the temperature was 60 deg C. and the humidity was 90%. Thereby, change in performances with time associated with influence of water was tracked. When the performances of the liquid crystal display devices of the invention were examined, performances of the liquid crystal display device of Comparative example were examined to make comparative evaluation of the performances. The results thereof are shown in Table 1 together.

In Table 1, as performances of the liquid crystal display devices, "black level (%)" and "reflectance (−)" are shown. The "black level" is an index for evaluating the contrast. The values before the liquid crystal display devices were left in the high temperature and high humidity environment (=0.025) are shown in the column of "0th hour." The values after the liquid crystal display devices were left in the high temperature and high humidity environment are shown in the column of "1000th hour." The "reflectance" is an apparent reflectance of the pixel electrode, and shows the values after the liquid crystal display devices were left in the high temperature and high humidity environment (after 1000 hours lapsed). As the "reflectance," the values are shown where the reflectance of the liquid crystal display device of Comparative example is normalized as 1.00. In Table 1, for reference, materials and contents (wt %) of the "sub component" are shown together with materials of the "main component" of the "alignment film."

TABLE 1

| | Alignment film | | Black level (%) | | |
|---|---|---|---|---|---|
| | Main component | Sub component (wt %) | 0th hour | 1000th hour | Reflectance (−) |
| Example 1-1 | Silicon oxide | Ti (0.1) | 0.025 | 0.046 | 1.00 |
| Example 1-2 | Silicon oxide | Ti (1) | 0.025 | 0.036 | 1.00 |
| Example 1-3 | Silicon oxide | Ti (10) | 0.025 | 0.032 | 0.95 |
| Example 1-4 | Silicon oxide | Ti (20) | 0.025 | 0.030 | 0.90 |
| Example 1-5 | Silicon oxide | Ti (25) | 0.025 | 0.030 | 0.50 |
| Example 2-1 | Silicon oxide | Al (1) | 0.025 | 0.038 | 1.00 |
| Example 2-2 | Silicon oxide | Al (10) | 0.025 | 0.035 | 1.00 |
| Example 3-1 | Silicon oxide | Cr (1) | 0.025 | 0.040 | 1.00 |
| Example 3-2 | Silicon oxide | Cr (10) | 0.025 | 0.035 | 1.00 |
| Example 4 | Silicon oxide | Ti, Al (2.5, 2.5) | 0.025 | 0.035 | 1.00 |
| Comparative example | Silicon oxide | — | 0.025 | 0.050 | 1.00 |

As evidenced by the results shown in Table 1, in the liquid crystal display devices of the invention (Examples 1-1 to 1-4, 2-1, 2-2, 3-1, 3-2 and 4) and Comparative example, the black level was increased after 1000 hours lapsed and thereby the contrast was lowered. However, when comparing the black level after 1000 hours lapsed of the examples of the invention to the Comparative example, the black level of the examples of the invention became smaller than that of Comparative example. More specifically, while the black level after 1000 hours lapsed was 0.050 in Comparative example, the black level after 1000 hours lapsed was 0.046 or less in the examples of the invention. It is needless to say that such a tendency is uniformly shown independently of the material of the moisture trap element as a sub component contained in the alignment film (titanium, aluminum, chromium, or a mixture of titanium and aluminum). Thereby, it was confirmed that in the liquid crystal display device of the invention, since the alignment film contained the moisture trap element together with silicon oxide, it became difficult for the black level to be increased with time in the high temperature and high humidity environment, and it became difficult for the image contrast to be lowered.

In this case, in particular, when comparison of the reflectance of the pixel electrode contributing to contrast lowering was made among the liquid crystal display devices of Examples 1-1 to 1-5 using titanium as a moisture trap element, differences of the reflectance were notable. Specifically, when the content of the moisture trap element was from 0.1 wt % to 20 wt %, the reflectance was 0.90 or more, that is, the pixel electrode showed sufficient apparent light reflectivity. However, when the content of the moisture trap element was 25 wt %, the reflectance was 0.50, that is, the apparent light reflectivity of the pixel electrode was significantly lowered. In the result, it was confirmed that when titanium was used as a moisture trap element, as far as the content of the moisture trap element was from 0.1 wt % to 20 wt %, it was difficult for the black level to be increased with time in the high temperature and high humidity environment, the apparent light reflectivity of the pixel electrode was continuously secured in the high temperature and high humidity environment, and therefore the image contrast is prevented from lowering.

While the liquid crystal display device or the liquid crystal display of the invention has been described with reference to the embodiment or examples, the invention is not limited to the aspects described in the foregoing embodiment or the foregoing examples. As described above, the structure of the liquid crystal display device or the liquid crystal display can be freely changed as far as long-time reliability of the display performance can be secured by stabilizing the alignment characteristics of the vertically aligned liquid crystal for a long time in association with the fact that the alignment film contains the moisture trap element together with silicon oxide.

Specifically, for example, in the foregoing embodiment or the foregoing examples, as a moisture trap element, the passivity forming element which is passivated by being reacted with water is used. However, the moisture trap element is not necessarily limited thereto, and an element used as a moisture trap element can be freely selected as far as the element traps water and thereby can prevent water from reaching the vertically aligned liquid crystal. In this case, effects similar to that of the foregoing embodiment or the foregoing examples can be obtained.

Further, in the foregoing embodiment or the foregoing examples, the liquid crystal display device or the liquid crystal display of the invention is applied to the reflective liquid crystal display device or the reflective liquid crystal display. However, application is not limited thereto, but, for example, the liquid crystal display device or the liquid crystal display of the invention can be applied to the transmissive liquid crystal display device or the transmissive liquid crystal display. In such a transmissive liquid crystal display device or such a transmissive liquid crystal display, the pixel electrode is made of a transparent electrode material such as ITO. In this case, effects similar to that of the foregoing embodiment or the foregoing examples can be obtained.

The liquid crystal display device or the liquid crystal display according to the invention can be applied to, for example, projection displays such as a reflective liquid crystal projector.

It should be understood by those skilled in the art that various modifications, combinations, sub-combinations and alternations may occur depending on design requirements and other factors insofar as they are within the scope of the appended claims or the equivalents thereof.

What is claimed is:

1. A liquid crystal display device comprising;
a semiconductor driver substrate;
a transparent electrode substrate;

alignment films, each of the semiconductor driver substrate and the transparent electrode substrate having an alignment film on surface thereof; and a vertically aligned liquid crystal between the semiconductor driver substrate and the transparent electrode substrate with the alignment films in between, wherein, the alignment films on the surfaces of the transparent electrode substrate and the semiconductor driver substrate that face the other, the alignment films contain silicon oxide and one or more moisture trap elements for trapping moisture.

2. The liquid crystal display device according to claim 1, wherein the moisture trap elements are passivity forming elements, which are changeable to a passive state through reaction with water.

3. The liquid crystal display device according to claim 2, wherein the passivity forming elements include titanium (Ti), aluminum (Al), chromium (Cr), or a mixture thereof.

4. The liquid crystal display device according to claim 1, wherein a content of the moisture trap elements are in the range from 0.1 wt % to 20 wt %.

5. The liquid crystal display device according to claim 1, wherein the alignment films are obliquely evaporated films.

6. The liquid crystal display device according to claim 1, wherein each of the alignment films has a laminated structure in which a vertically evaporated film and an obliquely evaporated film are sequentially layered from the side close to the semiconductor driver substrate or the transparent electrode substrate.

7. The liquid crystal display device according to claim 1, wherein the semiconductor driver substrate is a substrate including silicon device.

8. The liquid crystal display device according to claim 1 structured as a reflective liquid crystal display device, wherein the semiconductor driver substrate includes pixel electrodes having light reflectivity.

9. A liquid crystal display comprising a liquid crystal display device which displays an image by using light modulated by the liquid crystal display device, wherein the liquid crystal display device includes:

a semiconductor driver substrate;

a transparent electrode substrate;

alignment films, each of the semiconductor driver substrate and the transparent electrode substrate having an alignment film on the surface thereof; and a vertically aligned liquid crystal enclosed between the semiconductor driver substrate and the transparent electrode substrate with the alignment films in between, wherein, the alignment films on the surfaces of each transparent electrode substrate and the semiconductor driver substrate face the other, the alignment films contain silicon oxide and or more moisture trap elements for trapping moisture.

10. The liquid crystal display according to claim 9, further comprising: a light source for generating light; and a projection lens for projecting light modulated by the liquid crystal display device.

11. The liquid crystal display according to claim 10 structured as a reflective liquid crystal display, wherein the liquid crystal display device is a reflective liquid crystal display device including pixel electrodes having light reflectivity.

* * * * *